United States Patent
Peters et al.

(10) Patent No.: US 6,876,697 B2
(45) Date of Patent: Apr. 5, 2005

(54) APPARATUS AND METHOD FOR POWER RAMP UP OF WIRELESS MODEM TRANSMITTER

(75) Inventors: Ken Peters, Vancouver (CA); Enrico Murru, Burnaby (CA)

(73) Assignee: Sierra Wireless, Inc., Richmond (CA)

( * ) Notice: Subject to any disclaimer, the term of this patent is extended or adjusted under 35 U.S.C. 154(b) by 822 days.

(21) Appl. No.: 09/735,421

(22) Filed: Dec. 12, 2000

(65) Prior Publication Data

US 2002/0071482 A1 Jun. 13, 2002

(51) Int. Cl.⁷ .................................................. H04B 1/38
(52) U.S. Cl. ..................... 375/222; 455/127.1; 375/296
(58) Field of Search ................. 375/222, 285, 375/296–297, 312, 298; 332/103, 123, 159; 455/127.1, 114.3, 114.2, 115.1, 115.2, 115.3, 127.2, 127.3, 127.4; 330/2, 127, 133, 135, 141

(56) References Cited

U.S. PATENT DOCUMENTS

| | | | |
|---|---|---|---|
| 5,068,874 A | | 11/1991 | Leitch .......................... 375/51 |
| 5,091,919 A | * | 2/1992 | Kuisma ....................... 375/297 |
| 5,159,283 A | | 10/1992 | Jensen ......................... 330/129 |
| 5,351,016 A | * | 9/1994 | Dent ............................ 332/103 |
| 5,381,108 A | * | 1/1995 | Whitmarsh et al. ............. 330/2 |
| 5,548,616 A | * | 8/1996 | Mucke et al. ................ 375/295 |
| 5,642,378 A | | 6/1997 | Denheyer et al. ........... 375/216 |
| 5,748,037 A | * | 5/1998 | Rozental et al. ................ 330/2 |
| 5,752,172 A | * | 5/1998 | Matero ..................... 455/127.3 |
| 5,847,619 A | * | 12/1998 | Kirisawa ..................... 332/103 |
| 6,320,913 B1 | * | 11/2001 | Nakayama ................... 375/297 |

* cited by examiner

Primary Examiner—Tesfaldet Bocure
Assistant Examiner—Khanh Tran
(74) Attorney, Agent, or Firm—Thelen Reid & Priest, LLP (57) ABSTRACT

A transmitter of a wireless modem may be ramped up with quicker ramp up times and better splatter control by using software controllable ramp up techniques. A digital data signal source sends data to digital-to-analog converters used to generate a ramp with the desired duration and shape for maximum gain with minimum splatter. A transmitter digital-to-analog converter is sent constant I/Q data to bias the input of the I/Q modulator to maximum gain when combined with a direct current voltage. A controller digital-to-analog converter is sent incremented ramp data to shape the ramp and provide maximum gain at the output of the I/Q modulator.

47 Claims, 7 Drawing Sheets

APPARATUS AND METHOD FOR POWER RAMP UP OF WIRELESS MODEM TRANSMITTER

BACKGROUND OF THE INVENTION

1. Field of the Invention

The present invention generally relates to wireless communications modems and, more particularly, to an apparatus and method for ramping up the transmitter power of a wireless modem.

2. Description of the Related Art

Wireless modems generally modulate an RF carrier with a stream of data packets, then amplify the modulated carrier for transmission from an internal antenna. When a transmitter carrier is keyed on or first brought up to full power, the transmitter is essentially being amplitude modulated from an off state to a full powered on state. The quicker the transmitter power is ramped up, the wider the spread of spurious emissions, called splatter, occur around the carrier frequency. Splatter results in the placement of unwanted energy into adjacent channels in the ISM band, 900 MHz (Industrial, Scientific and Medical band).

Currently, wireless modems use hardware to reduce the level of the out of band energy, thereby lessening the chances of interference. The system controls the amount of splatter by controlling the speed at which power is ramped up in the transmitting device. One modem accomplishes this through the hardware by sensing the current supplied to a power amplifier in the transmitter during the power-up and power-down states and controlling the power gain of the power amplifier (PA) using a negative bias.

As transmission rates continue to increase, the specified amount of turn around time is shortening. The combination of high data rate and short turn around time requires that the transmitted packet have a minimum amount of overhead, thus ramping up the modem as quickly as possible with a minimum amount of splatter.

A disadvantage of the aforementioned hardware driven technique is that the degree of controlling the rate of the PA power gain, and thus the resultant splatter, is very limited. Typically in a transmitter, the output power is ramped up by increasing the gain of the PA or by applying power supply bias to the PA while driven with the carrier, as mentioned above. The shape of the ramp up curve is determined by some resistor/capacitor RC time constant and the transfer function of the PA. The amount of splatter that appears in adjacent channels, as measured by the amount of power in those channels, is proportional to the time rate of change of the power level (slope of the envelope shape) and the PA output power. A very steep envelope slope at low power levels will not cause sufficient splatter but the same slope near the PA's maximum power will cause considerable splatter. For a given total ramp up time, the amount of splatter can be minimized by ramping up the output power quickly at low power levels and then reduce the rate as full output power is approached. An RC time constant may nominally tend to do this, but the degree of controlling the rate of power increase in relation to the time rate of change of the power level is difficult and very limited when relying mainly on the hardware.

Some of the limitations of the prior art lie in its inability to effectively shorten the ramp up time while maintaining a low level of splatter between the transmitting channel and adjacent channels. Control of the ramp up curve is difficult to achieve with hardware alone, thus resulting in overly complex digital ramp circuitry which still has not been able to meet the needs required by advancing transmission speeds.

SUMMARY OF THE INVENTION

Accordingly, it is an objective of the present invention to provide a new and improved apparatus and method for ramping up the power of a transmitter of a wireless modem.

One avenue in which the above mentioned objective is accomplished by the present invention is in obtaining much better control by using a digital-to-analog converter to generate waveforms of ramp data with desired duration and shape. A software controlled method, which may be implemented through firmware and hardware, achieves much better control of the ramp up curve than the prior available hardware implemented systems.

The present invention overcomes the disadvantages and limitations of the prior art by providing a wireless modem including a direct current (DC) bias voltage, a constant amplitude waveform source, a variable amplitude waveform source, an In-phase/Quadrature modulator, a power amplifier and a transmitting antenna. The constant amplitude waveform source provides a constant amplitude waveform. The variable amplitude waveform source provides a first variable amplitude waveform and a second variable amplitude waveform. The In-phase/Quadrature (I/Q) modulator has an input, a gain control and an output. The input of the I/Q modulator being coupled in common with each of the constant amplitude waveform and the DC bias voltage. The gain control of the I/Q modulator coupled with the first variable amplitude waveform. The first variable amplitude waveform provides a first control voltage to bias the output of the I/Q modulator. The power amplifier (PA) has an input, a gain control and an output. The input of the PA is coupled with the output of the I/Q modulator. The gain control of the PA is coupled with the second variable amplitude waveform to provide a second control voltage to bias the output of the PA. The transmitting antenna is coupled with the output of the PA.

Another aspect of the presently claimed invention provides a method for ramping up the transmitter power of a wireless modem. The method includes turning on a power amp (PA) to a desired output, sending a start data to a modulator to provide a maximum modulator gain, reading a calibrated ramp target start-up data, subtracting a first subtraction value from the calibrated ramp target start-up value to provide a ramp start-up data, sending the calibrated ramp target start-up data to a control digital-to-analog converter (CTL_DAC) to provide a ramp data, waiting a first CTL_DAC settling time to provide for the output of the CTL_DAC to settle, incrementing the ramp data to provide a saturation region of the PA, and ramping up a value of a transmitter automatic gain control (TX_AGC).

Another embodiment provides a method for ramping up an output power of a transmitter. The method includes turning on a power amplifier (PA), stabilizing an output of the PA, combining a transmitter digital-to-analog converter (TX_DAC) output with a direct current voltage at an I/Q modulator input to bias the I/Q modulator to a maximum gain, sending a ramp-up data from a digital signal processor (DSP) to a controller digital-to-analog converter (CTL_DAC) to provide a first output voltage which determines the PA gain and a second output voltage which determines the I/Q modulator gain, ramping up a value of a transmitter automatic gain control (TX_AGC) data, and terminating sending the constant I/Q data to the TX_DAC, whereby successive data packets may then be sent.

For a better understanding of the present invention, together with other and further objects thereof, reference is made to the following description, taken in conjunction with the accompanying drawings, and its scope will be defined in the appending claims.

DETAILED DESCRIPTION OF THE INVENTION

Figure 1:
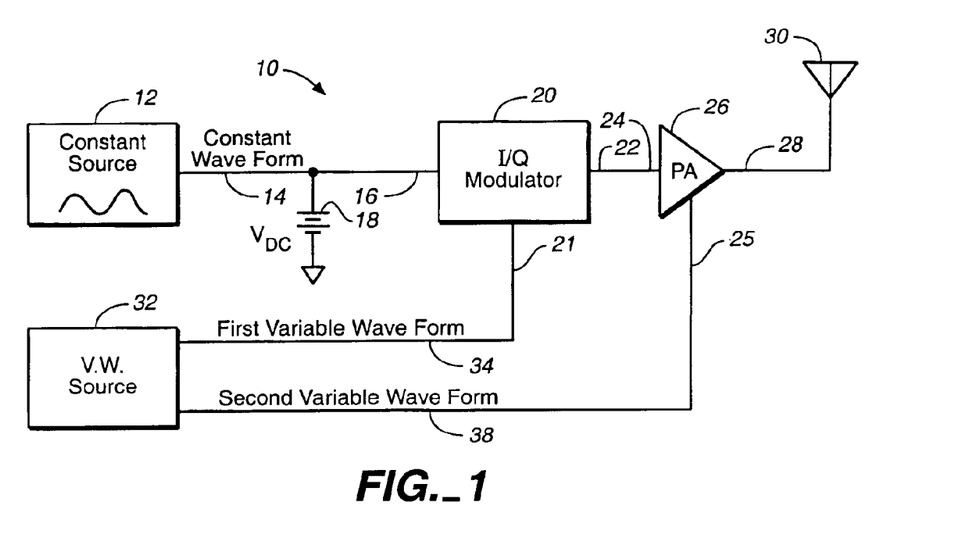
FIG. 1 is a block/schematic diagram of a wireless modem illustrative of an embodiment of the present invention.

In accordance with the presently claimed invention, FIG. 1 illustrates a block/schematic diagram of a wireless modem illustrative of an embodiment of the present invention and generally designated by numeral 10. The wireless modem 10 includes a direct current (DC) bias voltage 18, a constant amplitude waveform source 12, a variable amplitude waveform source 32, an In-phase/Quadrature (I/Q) modulator 20, a power amplifier (PA) 26 and a transmitting antenna 30. The constant amplitude waveform source 12 provides a constant amplitude waveform 14 which, being coupled in common with each of a direct current (DC) voltage 18 and an input 16 of a I/Q modulator 20, may be sufficient to bias the I/Q modulator 20 to maximum gain. The I/Q modulator 20 further includes a gain control 21 and an output 22.

The variable amplitude waveform source 32 provides a first variable amplitude waveform 34 and a second variable amplitude waveform 38. The I/Q modulator output 22 is coupled with a PA input 24. The first variable amplitude waveform 34 is coupled with the I/Q modulator gain control 21. The PA 26 further includes a PA gain control 25 coupled with the second variable amplitude waveform 38. The PA output 28 is coupled with the transmitting antenna 30.

Figure 2:
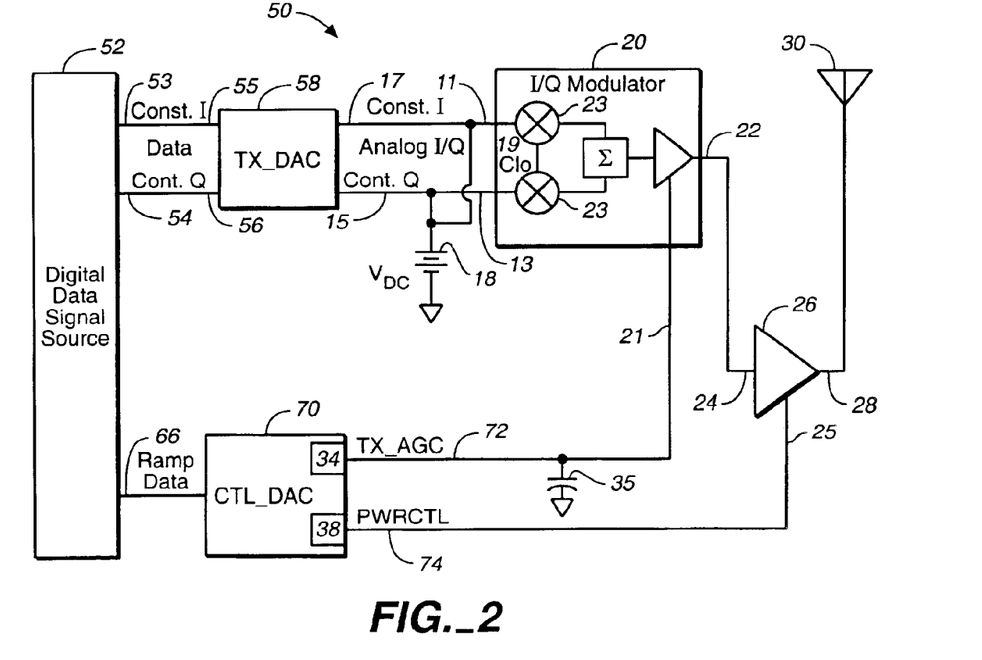
FIG. 2 illustrates a schematic/block diagram of an embodiment of the instant invention.

FIG. 2 illustrates a schematic/block diagram of an embodiment of the instant invention and is generally designated by the numeral 50. A digital signal source 52 provides a constant In-Phase (I) data 53, a constant Quadrature (Q) data 54 and a ramp data output 66. Optionally, the digital signal source 52 may be a digital signal processor (DSP). The constant I data 53 and constant Q data 54 may be a calculated value of the constant (I,Q) pair providing the additional bias required to provide a specific decibel level power at the PA output 28. By way of example, the specified decibel level may be 30 dBm. The constant I data 53 coupled with a first input 55 of a transmitter digital-to-analog converter (TX_DAC) 58. The constant Q data 54 coupled with a second input 56 of the TX_DAC 58. Both the constant I data 53 and the constant Q data 54 are constant digital signals provided by the digital signal source 52 which, for example, may be the values needed to provide the additional bias required to provide power at the PA 26. By way of example, the power at the PA 26 may be 30 dBm.

The TX_DAC 58 converts the digital signals into analog signals. Accordingly, the TX_DAC 58 provides a constant amplitude waveform including a constant I analog data 17 and a Q analog data 15 to the I/Q modulator 20. The I analog data 17 being coupled in common with a direct current (DC) voltage 18 and a first input 11 of the I/Q modulator 20. The Q analog data 15 being coupled in common with the DC voltage 18 and a second input 13 of the I/Q modulator 20. These couplings may be sufficient to bias the I/Q modulator 20 to maximum gain. In a preferred embodiment, the TX_DAC 58 may for example be a MAX5180 digital-to-analog converter commercially available from MAXIM.

The I/Q modulator 20 further includes a local oscillator 19 which is supplied from an outside source and two mixers 23. The local oscillator 19 is mixed with the I analog data 17 and the Q analog data 15 signals. The output of the two mixers 23 are summed up inside the chip, and passed through the amplification stage, the gain of which is controlled by the TX_AGC signal 72. The output 22 of the I/Q modulator 20 is then coupled with the PA input 24. The PA output 28 is coupled with the transmitting antenna 30.

A controller digital-to-analog converter (CTL_DAC) 70 receives the ramp data output 66 from the digital signal source 52 in digital form at a CTL_DAC input 68. The CTL_DAC then converts the digital data into analog data, such as a first variable amplitude waveform 34 and a second variable amplitude waveform 38. The first variable amplitude waveform 34 is written to the transmitter automatic gain control (TX_AGC) line 72. The TX_AGC line 72 is coupled with the I/Q modulator gain control 21 to provide the I/Q modulator 20 gain. The second variable amplitude waveform 38 is written to the power control (PWRCTL) line 74. The PWRCTL line 74 is coupled with the PA gain control 25 to provide the PA 26 gain. The control of the power ramp was changed so that incremented values written to the TX_AGC line 72 by the CTL_DAC 70 would shape the transmitter ramp up curve. In a preferred embodiment, the CTL_DAC 70 may be a TLA5627 digital-to-analog converter.

It is also possible to ramp up the output with the PWRCTL line 74, but that would not provide the same degree of control as TX_AGC line 72 due to the response time of the PWRCTL integrating op-amp U2-A and associated circuits, not shown. The amount of splatter is very sensitive to the shape of the ramp up curve and therefore it may be necessary to calibrate the ramp target value for each modem. If required, the calibration procedure would involve determining the minimum value that, when written to the CTL_DAC 70 such as the TLV5627, produces 30 dBm output. It should also be pointed out that the modulator's AGC transfer function also varies with temperature and a compensating method to adjust the ramp target value over temperature may be required.

Another aspect of the present invention is the addition of a 'smoothing' capacitor 35 on the TX_AGC line 72. By way of example, a 330 pF capacitor may be used. The value of the capacitor 35 may be optimized with respect to the following considerations: 1) if the value of this capacitor is increased significantly, the RC time constant will start to dominate the shape of the ramp curve and thus deteriorate the amount of control that the TX_AGC line 72 will have on the ramp curve; and 2) if the value of this capacitor is decreased significantly, the voltage steps on the TX_AGC line 72 will not be smoothed adequately, resulting in more splatter as full power is approached.

Figure 3:
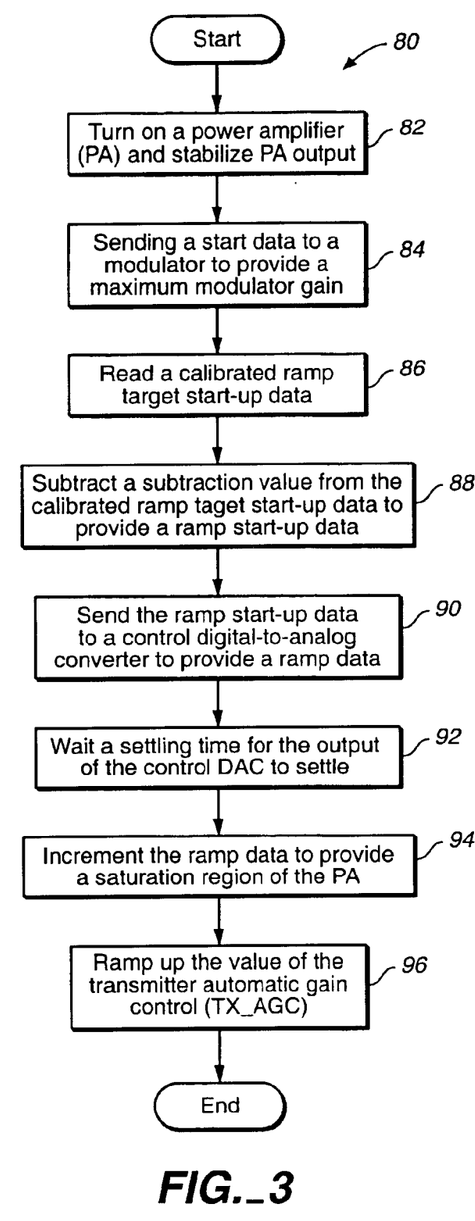
FIG. 3 is a flow chart useful in describing a method for ramping up an output power of a transmitter of a wireless modem.

FIG. 3 illustrates a flow chart useful in describing a method for ramping up an output power of a transmitter of a wireless modem and is designated referenced generally by numeral 80. Referring to FIG. 2 and FIG. 3, the method 80 begins with turning on a power amplifier (PA) 26 and allowing the output 28 of the PA 26 to stabilize, as indicated at 82. By way of example, sending the PWRCTL 74 data to turn on the PA 26 to a desired output level, such as +30 dBm, may be used to turn on the PA 26. Optionally, the time allowed for the PA output 28 to stabilize may be 15 $\mu$S.

Constant I data 53 and Q data 54 values are then sent to the TX_DAC 58, as indicated at 84. In an embodiment, 'raw' values of I=0x0004 and Q=0xA6A2 may be used. Such values of I/Q are then converted into analog signals via the TX_DAC 58. The constant analog I data 17 is combined with a DC bias voltage 18 at an I/Q modulator input 11. The constant analog Q data 15 is combined with a DC bias voltage 18 at an I/Q modulator input 13. As discussed above, these analog signals are then summed up inside the chip and passed through an amplification stage. This process may be sufficient to bias the I/Q modulator 20 to maximum gain.

At the same time that the I/Q data is being sent, as indicated at 84, ramp target data is read, as indicated at 86. By way of example, the target start-up data is typically 182. Optionally the target start-up data may range from 0 to 255. Next a subtraction value is subtracted from the ramp target data to provide a ramp start-up value, as indicated at 88. According to an embodiment, the subtraction value may be 24. Optionally, the subtraction value may range from 0 to 255. The ramp start-up value is then sent to the controller digital-to-analog converter (CTL_DAC), as indicated at 90. The value written to the CTL_DAC represents the start of the ramp-up. Then the method 80 waits a settling time for the output of the CTL_DAC to settle, as indicated at 92. The settling time may, for example, be 2 $\mu$S. Next the ramp data is incremented to provide a saturation region of the PA 26, as indicated at 94. In an embodiment, the value of the ramp data is incremented in 8 steps of 3, allowing 1 $\mu$S after each time the data is written to the DAC. Accordingly, the saturation region of the PA may be reached. Finally, the value of the transmitter automatic gain control (TX_AGC) is ramped up, as indicated at 96.

Figure 4:
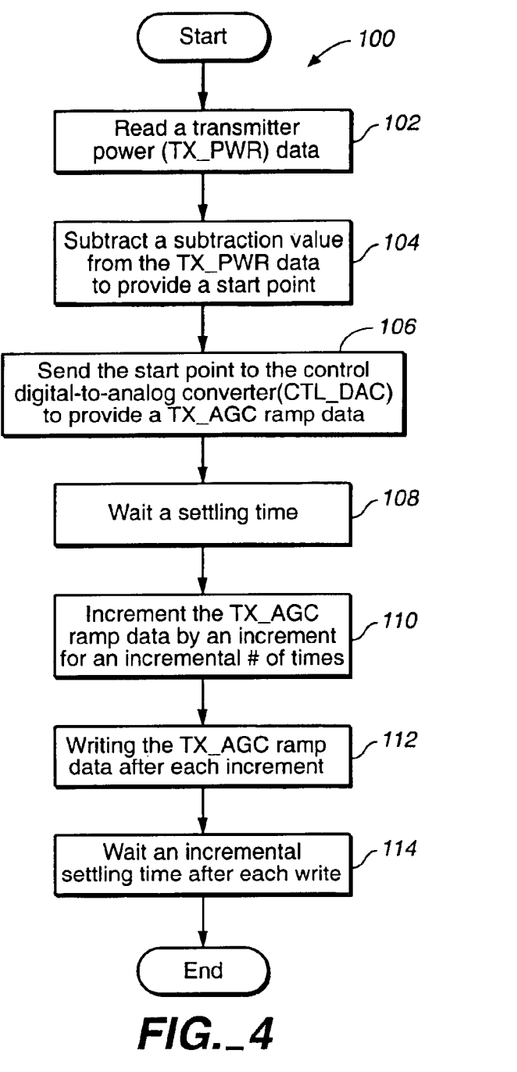
FIG. 4 is a flow chart useful in describing a method for ramping up a value of a transmitter automatic gain control.

FIG. 4 illustrates a flow chart useful in describing a method for ramping up a value of a transmitter automatic gain control and is generally designated by the numeral 100. The method 100 may insure that the output of the modulator 20 may be sufficient to keep the PA 26 output in saturation under most output loading conditions. Now referring to FIG. 2 and FIG. 4, method 100 first retrieves the data for the transmitter power (TX_PWR), as indicated at 102. The TX_PWR data represents the value of the TX_AGC that may be required to keep the PA 26 in constant saturation. For example, the TX_PWR data may be 255. Optionally, the TX_PWR data may range from 0 to 255. Next a subtraction value is subtracted from the TX_PWR data to provide a start point, as indicated at 104. This subtraction value may range from 0 to 255. By way of example, the subtraction value is 48. The start point is the beginning of the second series of incremental steps in TX_AGC. The start point data is then sent to the control digital-to-analog converter to provide a TX_AGC ramp data, as indicated at 106. A settling time is waited, as indicated at 108. The settling time, for example, may be 50 nS. Settling criterion may not be as critical in the second series of TX_AGC ramp increments since the PA output is already in saturation.

The TX_AGC ramp data is then incremented by an increment for an incremental number of times, as indicated at 110. Optionally, the value of the ramp data may be increased in three steps of sixteen. The TX_AGC ramp data is written to the digital-to-analog converter after every increment, as indicated at 112. Finally, a settling time is waited for the output of the CTL_DAC to settle, as indicated at 114. The settling time may be 50 nS for example. However, as stated above, the settling criterion may not be as critical in the second series of TX_AGC ramp increments since the PA output is already in saturation.

Figure 5:
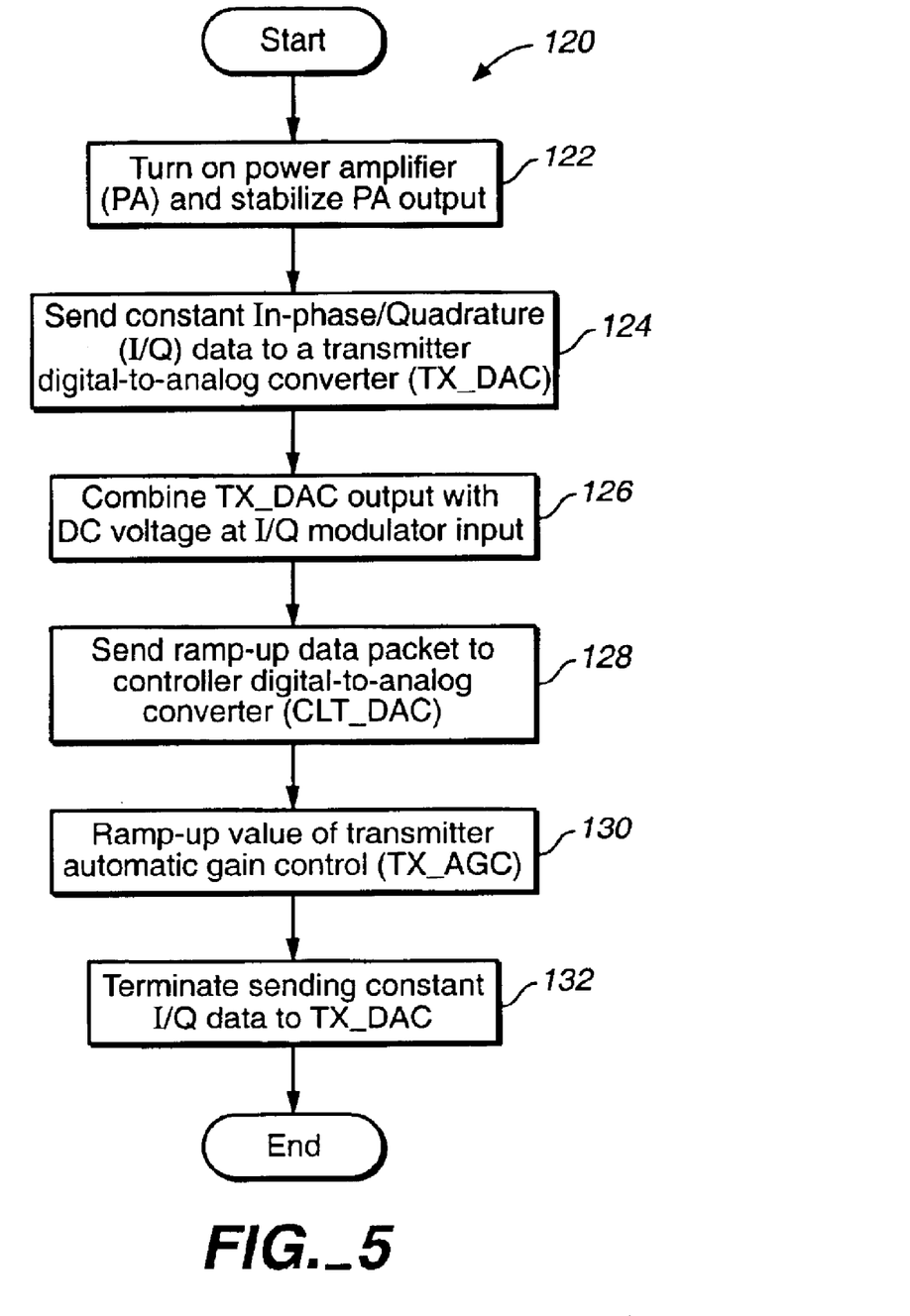
FIG. 5 is a flow chart useful in describing a method for ramping up an output power of a transmitter of a wireless modem.

FIG. 5 illustrates a flow chart useful in describing a method for ramping up an output power of a transmitter of a wireless modem and is generally designated by the numeral 120. Referring to FIG. 2 and FIG. 5, the method 120 begins with turning on a power amplifier (PA) 26 and stabilizing the PA output 28, as indicated at 122. By way of example, the time allowed for the PA 26 to stabilize may be 15 $\mu$S.

Constant I and Q data values are then sent to the TX_DAC 58, as indicated at 124. By way of example, "raw" values of I=0x0004 and Q=0xA6A2 may be used. The I/Q values may be combined with a DC voltage 18 at the input of the modulator 20 to sufficiently bias the I/Q modulator 20 to maximum gain, as indicated at 126.

At the same time that the I/Q data is being sent, as indicated at 124, ramp-up data is sent to the CTL_DAC 70, as indicated at 128. The value of the transmitter automatic gain control (TX_AGC) data is then ramped up, as indicated at 130. Once the transmitter has been ramped up, the sending of the constant I/Q data to the TX_DAC 58 is terminated, as indicated at 132.

Figure 6:
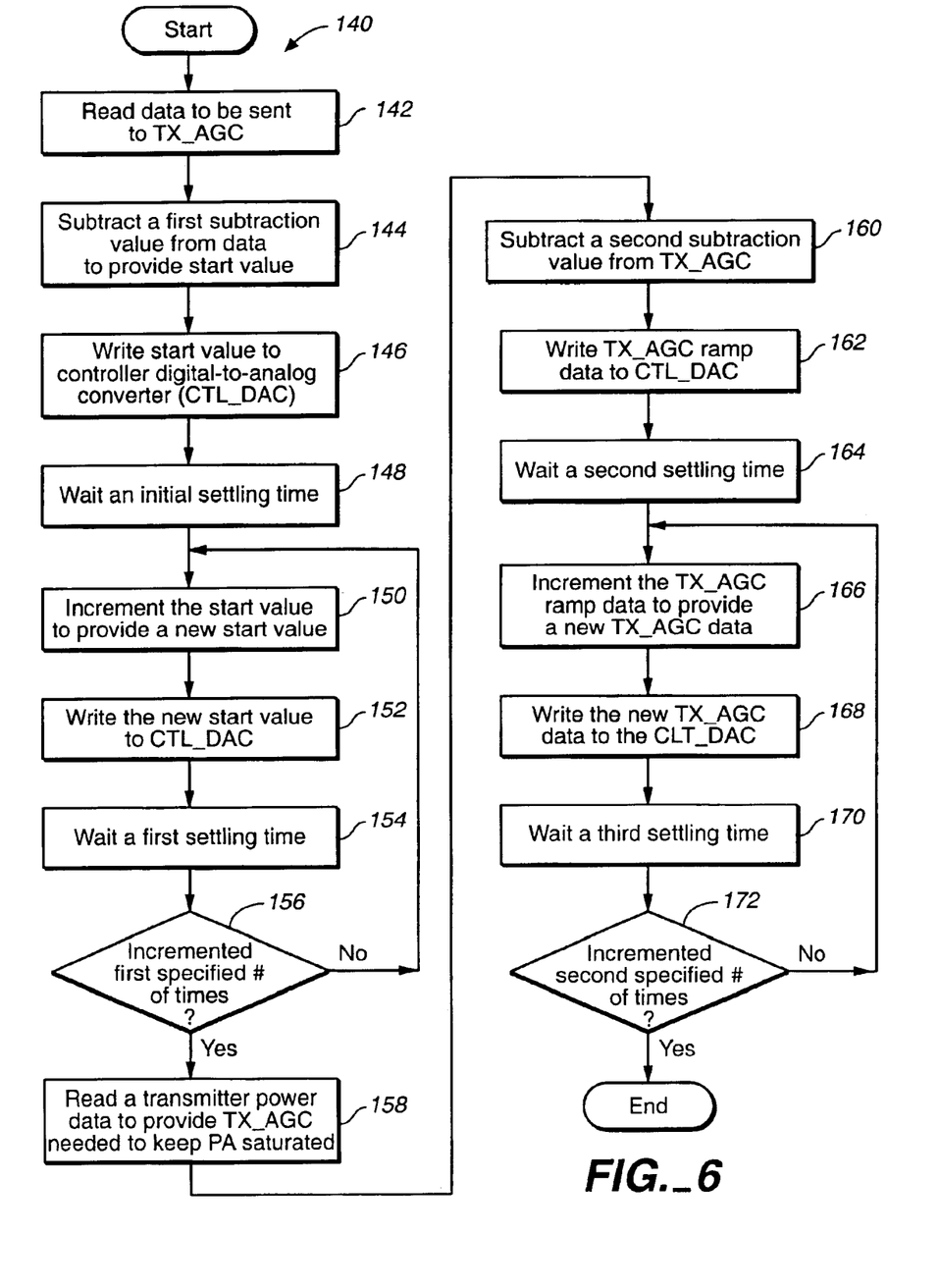
FIG. 6 is a flowchart useful in describing a method of ramping up the value of the TX_AGC data.

Illustrated in FIG. 6, there is shown a flowchart useful in describing a method of ramping up the value of the TX_AGC data, and generally designated as numeral 140. Now referring to FIG. 2 and FIG. 6, the method 140 begins with the digital data signal source 52 reading the calibrated value of the data to be sent out to the TX_AGC, as indicated at 142. As mentioned above, optionally the digital data signal source 52 may be a digital signal processor (DSP). In an embodiment, wherein the ramp data is being sent to a CTL_DAC 70 which may be, for example, a TLV5627 digital-to-analog converter commercially available from Texas Instruments, the calibrated value may be an 8-bit value that will correspond to a decimal value from 0 to 255. This is the 'target' value for the TX_AGC and represents the end point of the ramp up curve (or the start point of a ramp down curve). This value typically may be 182 for the Bullet modem.

As illustrated at 144, a subtraction value is then subtracted from the calibrated value to provide a start value. In an embodiment, the subtraction value may be 24. This start value represents the start of the ramp up curve and is then written to a CTL_DAC 70, as indicated at 146. Since this is a relatively large change in data value, an initial settling time is allowed to pass to allow for the output of the CTL_DAC 70 to settle, as indicated at 148. Optionally, the initial settling time may be 2 $\mu$S. The length of the initial settling time is dependent on the particular DAC's specified settling time and may vary in duration.

As indicated at 150, after the output of the CTL_DAC 70 is settled, the start value is incremented to provide for a new start value. The new start value, now referred to as the start value, is then written to the CTL_DAC 70, as indicated at 152. Next at 154, a first settling time is allowed to pass in order to shape the curve in such a way that the approach to full power is done very smoothly. In an embodiment, the first settling time may be 1 µS. It is then determined whether the start value has been incremented a first specified number of times by a specified increment, as indicated at 156. By way of example, an embodiment increments the value of the ramp data in eight steps of three, allowing for 1 µS after each write to the CTL_DAC. At this stage, the saturation region of the PA may have been reached.

Once the start value has been incremented the specified number of times, the next stage entered into may insure that the output of the modulator 20 may be sufficient to keep the PA 26 output in saturation under most output loading conditions. As indicated at 158, the data for TX_PWR is retrieved. The retrieved value represents the value of TX_AGC that may be required to keep the PA 26 in constant saturation. Alternatively, the TX_PWR value is 255. Next a subtraction value is subtracted from the TX_AGC value, as indicated at 160. By way of example, the subtraction value may be 48. The TX_AGC value after the subtraction represents the ramp starting point for the second series of incremental steps in TX_AGC. The TX_AGC ramp data value is then sent toe the CTL_DAC, as indicated at 162. Next a second settling time is allowed to pass, as indicated at 164. Since the settling criterion is not as critical in this second series of TX_AGC ramp increments, because the output of the PA 26 may already be in saturation, an example of the second settling time may be 50 nS.

As indicated at 166, the TX_AGC ramp data value is incremented to provide for a new TX_AGC ramp data value. The new TX_AGC ramp data value, now referred to as the TX_AGC ramp data value, is then written to the CTL_DAC 70, as indicated at 168. Next at 170, a third settling time is allowed to pass in order to shape the curve in such a way that the approach to full power is done very smoothly. In an embodiment, the third settling time may be, for example, 50 nS. It is then determined whether the start value has been incremented a first specified number of times by a specified increment, as indicated at 172. By way of example, an embodiment increments the value of the ramp data in three steps of sixteen, allowing for 50 nS after each write to the CTL_DAC. Once the total number of increments have been reached, the ramp up is complete.

Optionally, the hardware can include the Bullet™ Type II PC card, a Metricom™ data modem for laptop computers using Windows 95™, Windows 98™, Windows NT™ and Windows 2000™. The data modem can also be used for hand held computers running Windows CE 2.1™ or higher and will operate on Metricom's MCDN network.

The data modem presently supports data rates up to 125 kBaud and specifies a turnaround time of 1.4 ms (this is for Pi/4 QPSK double speed, but is longer for the higher modulation gears). The combination of high data tare and short turn around time requires that the transmitted packet have a minimum amount of overhead. To this end, Metricom has specified that the ramp up for the transmitter on the modem occur within a 30 µS time interval.

The splatter due to the transmitter ramp up is determined by measuring the power in the adjacent channels with 30 dBm carrier power. The Metricom specification states that this power must be −23 dBm at ±2 Ch, −25 dBm at ±3 Ch, −25 dBm at ±6 Ch and −28 dBm at ±9 Ch.

Figure 7:
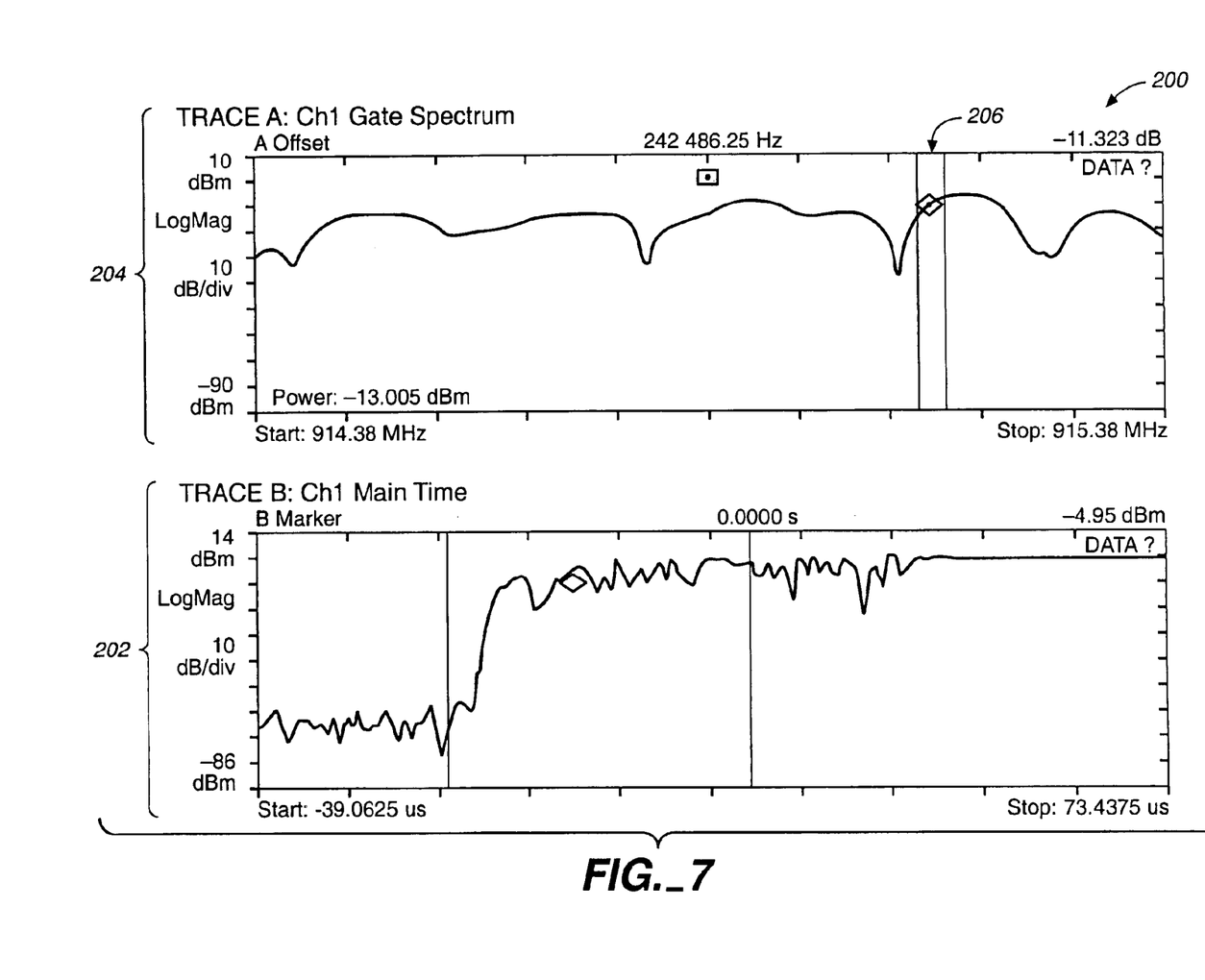
FIG. 7 is an empirical representation of transmitter ramp up and resultant splatter of a known device.

FIG. 7 is an empirical representation of transmitter ramp up and resultant splatter of a known device and is generally designated by the numeral 200. The ramp up curve showed a considerable amount of ripple and the final steady state carrier level was reached after approximately 60 µS. The ramp up characteristics are illustrated by the lower half 202 of the display 200 and the spectral density of the signal due to this ramp up is illustrated by the upper half 204 of the display 200. This measurement was made with an HP89441A Vector Signal Analyzer. A total attenuation of 27 dB was used between the output of the Bullet board and the input of the VSA; therefore a level of 3 dBm at the VSA represents 30 dBm from the Bullet board. Channel 80, a 914.88 MHZ carrier, was used for this test.

The two vertical bars 206 in the upper half 204 of the display 200 enclose a 30 kHz wide band centered approximately 240 kHz from the carrier (two channels above carrier). The power in this band is −13 dBm, which is only −16 dBc and is just inside the second channel away from the channel under test. The specification states that this band should be −53 dBc for a 30 dBm carrier and therefore this measurement violates the splatter specification by 37 dB.

Figure 8:
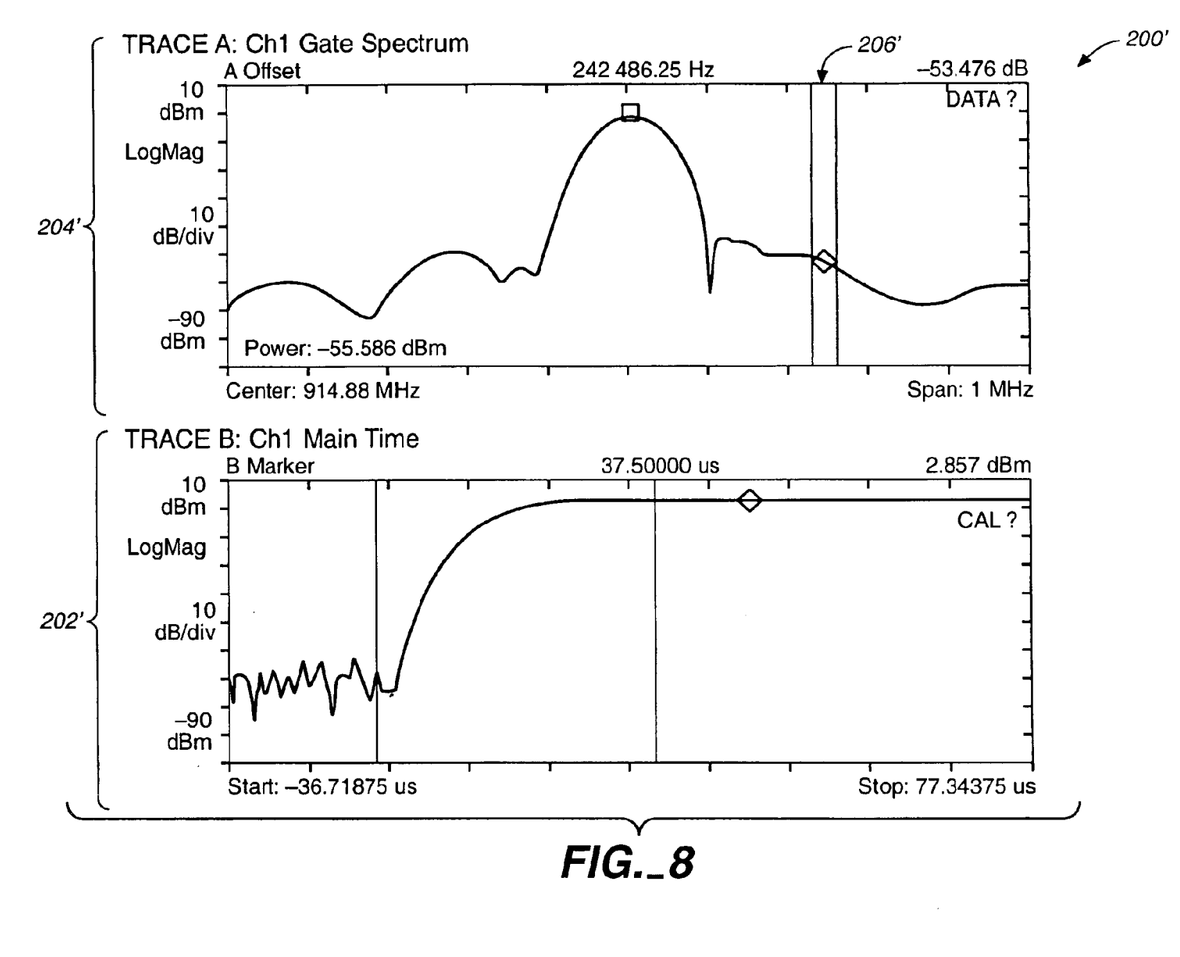
FIG. 8 is an empirical representation of the transmitter ramp up and resultant splatter on the known device of FIG. 7 incorporating a method and apparatus of the present invention.

FIG. 8 is an empirical representation of the transmitter ramp up and resultant splatter on the known device of FIG. 7 incorporating a method and apparatus of the present invention and is generally designated by the numeral 200'. The display 200' shows the ramp up characteristics in the upper half 204' and the spectral density due to this ramp up in the lower half 202' on an Eng 1.0 modem. This measurement was made with an HP89441A Vector Signal Analyzer. A total attenuation of 27 dB was used between the output of the Bullet board and the input of the VSA, therefore a level of 3 dBm at the VSA represents 30 dBm from the Bullet board. Channel 80 was used for this test (914.88 MHZ carrier).

The two vertical bars 206' in the upper half 204' of the display 200' enclose a 30 kHz wide band centered approximately 240 kHz from the carrier. The power in this band is −55 dBm, which is −58 dBc for 3 dBm at the input of the VSA and is just inside the second channel away from the channel under test. The Metricom specification states that the total power in this band is −23 dBm maximum for a 30 dBm carrier (−53 dBc) and thus this measurement represents a margin of 5 dB within the specification.

Figure 9:
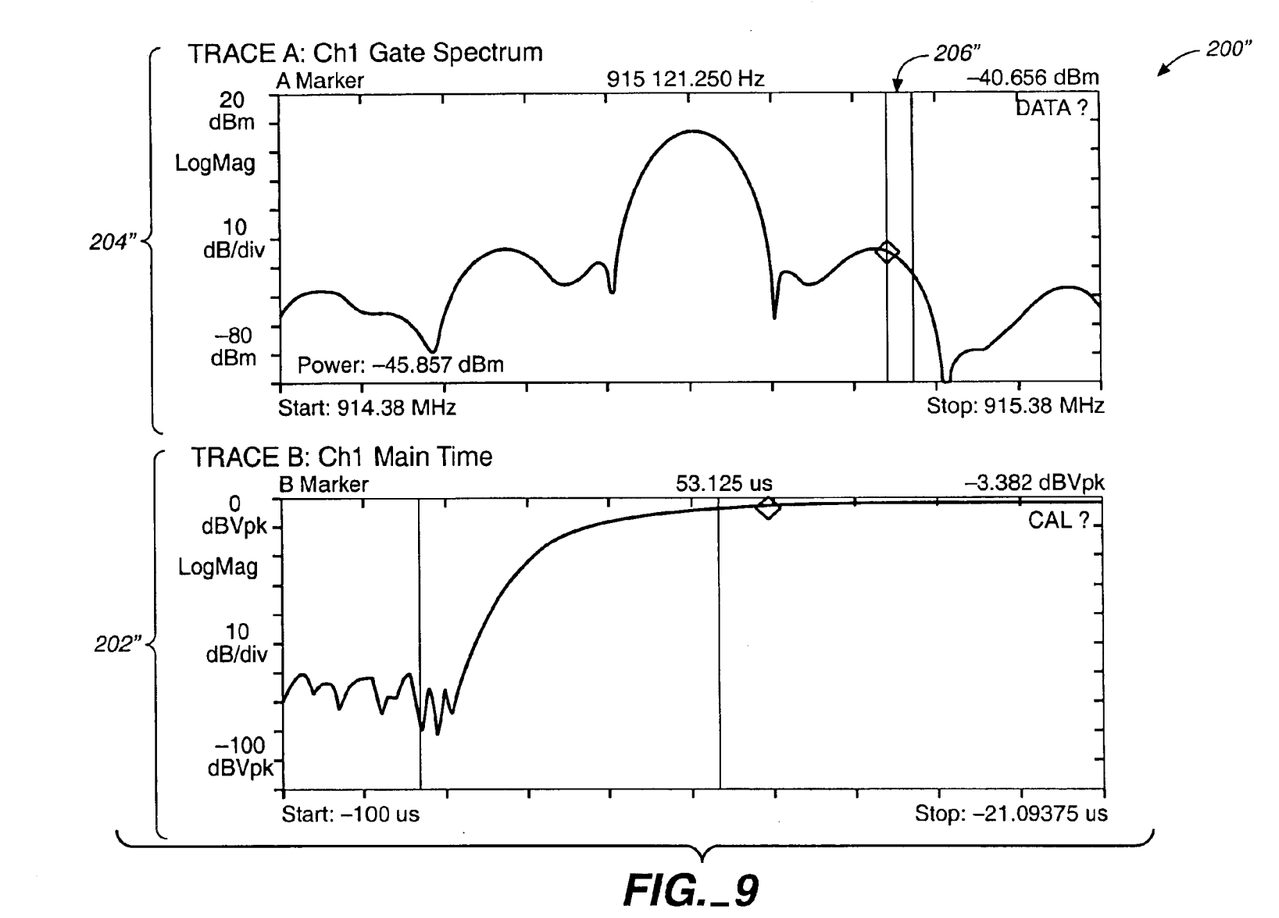
FIG. 9 is yet another empirical representation of the transmitter ramp up and resultant splatter on the known device of FIG. 7 incorporating a method and apparatus of the present invention.

FIG. 9 is yet another empirical representation of the transmitter ramp up and resultant splatter on the known device of FIG. 7 incorporating a method and apparatus of the present invention and is generally designated by the numeral 200". The display 200" shows the ramp up characteristics in the upper half 204" and the spectral density due to this ramp up in the lower half 202" on an Eng 2.1 modem. This measurement was again made with an HP89441A Vector Signal Analyzer. A total attenuation of 22 dB was used between the output of the Bullet board and the input of the VSA, therefore a level of 8 dBm at the VSA represents 30 dBm from the Bullet board. Channel 80 was used for this test (914.88 MHZ carrier).

The two vertical bars 206" in the upper half 204" of the display 200" enclose a 30 kHz wide band centered approximately 240 kHz from the carrier. The power in this band is −45 dBm, which is −53 dBc for 8 dBm at the input of the VSA and is just inside the second channel away from the channel under test. The Metricom specification states that the total power in this band is −23 dBm maximum for a 30 dBm carrier (−53 dBc) and thus this measurement is marginally within the specification. Note that the results on the Eng 1.0 boards with the old Micro Devices RF2131 PA were somewhat better than what was achieved on the Eng 2.1 boards with the new RF2137 PA.

While there has been described what are believed to be the exemplary embodiments of the present invention, those skilled in the art will recognize that other and further changes and modifications may be made thereto without departing from the scope of the invention which is defined by the appended claims, and it is intended to claim all such changes and modifications as fall within the true scope of the invention.

What is claimed is:

1. A wireless modem, comprising:
   a direct current (DC) bias voltage;
   a constant amplitude waveform source to provide a constant amplitude waveform
   a variable amplitude waveform source to provide a first variable amplitude waveform and a second variable amplitude waveform;
   an In-phase/Quadrature (I/Q) modulator including an input, a gain control and an output, the input of the I/Q modulator being coupled in common with each of the constant amplitude waveform and the DC bias voltage, the gain control of the I/Q modulator coupled with the first variable amplitude waveform, wherein the first variable amplitude waveform provides a first control voltage to bias the output of the I/Q modulator;
   a power amplifier (PA) including an input, a gain control and an output, the input of the PA coupled with the output of the I/Q modulator, the gain control of the PA coupled with the second variable amplitude waveform, wherein the second variable amplitude waveform provides a second control voltage to bias the output of the PA; and
   a transmitting antenna coupled with the output of the PA,
   wherein the constant amplitude waveform source is configured to provide the constant amplitude waveform at device power-up to thereby bias said I/Q modulator to maximum gain, and wherein the variable amplitude waveform source is configured to provide a ramp-up waveform at device start-up to thereby reach a saturation region of the power amplifier.

2. The wireless modem as recited in claim 1, further comprising:
   a digital data signal source including a first output to provide a preselected constant digital data and a second output to provide a ramp-up data;
   a transmitter digital-to-analog converter (TX_DAC) including an first input, and an output, the input of the TX_DAC being coupled with the first output of the digital data signal source for application of the constant digital data packet, the output of the TX_DAC to provide the constant amplitude waveform;
   a controller digital-to-analog converter (CT_DAC) including an input, a first output and a second output, the input of the CTL_DAC being coupled with the second output of the digital data signal source, the first output of the CTL_DAC to provide the first variable amplitude waveform to determine an I/Q modulator gain and the second output of the CTL_DAC to provide the second variable amplitude waveform to determine a power amplifier gain;
   a smoothing capacitor coupled with the first output of the CTL_DAC.

3. The wireless modem as recited in claim 2, wherein the preselected constant digital data packet comprises a I/Q data.

4. The wireless modem as recited in claim 2, wherein the digital data signal source further comprises a digital signal processor.

5. The wireless modem as recited in claim 2, wherein the TX_DAC comprises a MAX518Q digital-to-analog converter commercially available by Maxim.

6. The wireless modem as recited in claim 2, wherein the CTL_DAC comprises a TLV5627 digital-to-analog converter commercially available by Texas Instruments.

7. The wireless modem as recited in claim 2, wherein the smoothing capacitor comprises a 330 pF capacitor.

8. A method for ramping up the transmitter power of a wireless modem, the method comprising the steps of:
   turning on a power amp (PA) to a desired output;
   sending a start data to a modulator to provide a maximum modulator gain;
   reading a calibrated ramp target start-up data;
   subtracting a first subtraction value from the calibrated ramp target start-up value to provide a ramp start-up data;
   sending the calibrated ramp target start-up data to a control digital-to-analog converter (CTL_DAC) to provide a ramp data;
   waiting a first CTL_DAC settling time to provide for the output of the CTL_DAC to settle;
   incrementing the ramp data to provide a saturation region of the PA; and ramping up a value of a transmitter automatic gain control (TX_AGC).

9. The method as recited in claim 8, wherein turning on a PA comprises sending PWRCTL data to a PA PWRCTL line.

10. The method as recited in claim 8, wherein the desired output is +30dBm.

11. The method as recited in claim 8, wherein turning on the PA further comprises waiting a PA settling time for the PA output to settle.

12. The method as recited in claim 11, wherein the PA settling time is 15, uS.

13. The method as recited in claim 8, wherein the start data is an I/Q data.

14. The method as recited in claim 13, wherein the I/Q data is constant.

15. The method as recited in claim 8, wherein the calibrated ramp target start-up data is 182.

16. The method as recited in claim 8, wherein the first subtraction value is 24.

17. The method as recited in claim 8, wherein the first CTL_DAC settling time is 2, $\mu S$.

18. The method as recited in claim 8; wherein incrementing the ramp data comprises the steps of:
   incrementing a value of the ramp data by an increment for an incremental number of times;
   writing the value of the ramp data to the CTL_DAC; and
   waiting an incremental settling time.

19. The method as recited in claim 18, wherein the increment is 3.

20. The method as recited in claim 18, wherein the incremental number of times is 8.

21. The method as recited in claim 18, wherein the incremental settling time is 1 $\mu S$.

22. The method as recited in claim 8, wherein ramping up a value of a transmitter automatic gain control (TX_AGC) comprises the steps of:

reading a transmitter power (TX_PWR) data;

subtract a second subtraction value from the TX_PWR data to provide a start point;

sending the start point to the CTL_DAC to provide a TX_AGC ramp data;

waiting a start point settling time;

incrementing the TX_AGC ramp data by an second increment for a second incremental number of times;

writing the TX_AGC ramp data to the CTL_DAC after each increment; and waiting a second incremental settling time after each write.

23. The method as recited in claim 22, wherein the TX_PWR data is 255.

24. The method as recited in claim 22, wherein the second subtraction value is 48.

25. The method as recited in claim 22, wherein the start point settling time is 50 nS.

26. The method as recited in claim 22, wherein the second increment is 16.

27. The method as recited in claim 22, wherein the second incremental number of times is 3.

28. The method as recited in claim 22, wherein the second incremental settling time is 50 nS.

29. A method for ramping up an output power of a transmitter, comprising the steps of:

turning on a power amplifier (PA);

stabilizing an output of the PA;

sending constant In-phase/Quadrature data to a transmitter digital-to-analog converter (TX_DAC);

combining a TX_DAC output with a direct current voltage at an I/Q modulator input to bias the I/Q modulator to a maximum gain;

sending a ramp-up data from a digital signal processor (DSP) to a controller digital-to-analog converter (CTL_DAC) to provide a first output voltage which determines the PA gain and a second output voltage which determines the I/Q modulator gain;

ramping up a value of a transmitter automatic gain control (TX_AGC) data; and terminating sending the constant I/Q data to the TX_DAC whereby successive data packets may then be sent.

30. The method as recited in claim 29, wherein turning on the PA comprises sending PWRCTL data to a PA PWRCTL line to provide a desired output level.

31. The method as recited in claim 30, wherein the desired output level is +30 dBm.

32. The method as recited in claim 29, wherein stabilizing the output of the PA comprises waiting a PA settling time.

33. The method as recited in claim 32, wherein the PA settling time is 15, $\mu S$.

34. The method as recited in claim 29, wherein the step of ramping up the value of the TX_AGC data comprising the steps of:

a) reading a calibrated value of a data to be sent to the TX_AGC;

b) subtracting a first subtraction value from the calibrated value to provide a start value, whereby the start value represents a start of the transmitter ramp-up curve;

c) writing the start value to the CTL_DAC;

d) waiting an initial settling time to provide for an CTL_DAC output to settle;

e) incrementing the start value by adding the start value to a first incremental value to provide an incremented start value;

f) writing the incremented start value to the CTL_DAC, wherein the incremented start value is now designated as the start value;

g) waiting a first settling time;

h) determining a number of incremental steps;

i) repeating (e) through (h) until the number of incremental steps equals a first incremental end value;

j) reading a TX_PWR data to provide a TX_AGC value required to keep the PA in constant saturation;

k) subtracting a second subtraction value from the TX_AGC value to provide a TX_AGC ramp data;

l) writing the TX_AGC ramp data to the CTL_DAC;

m) waiting a second settling time;

n) incrementing the TX_AGC ramp data by adding the TX_AGC ramp data to a second incremental value to provide an incremented TX_AGC ramp data, wherein the incremented TX_AGC ramp data is now designated as the TX_AGC ramp data;

o) writing the TX_AGC ramp data to the CTL_DAC;

p) waiting a third settling time;

q) determining a second number of incremental steps;

r) repeating (n) through (q) until the second number of incremental steps equals a second incremental end value.

35. The method as recited in claim 34, wherein the calibrated value of the data to be sent to the TX_AGC is an 8-bit value corresponding to a decimal value selected from the group of decimals consisting of 0 through 255, whereby the decimal value is the target value for the TX_AGC and represents an end point of the transmitter ramp-up curve.

36. The method as recited in claim 35, wherein the decimal value is 182.

37. The method as recited in claim 34, wherein the first subtraction value is 24.

38. The method as recited in claim 34, wherein the initial settling time is 2 $\mu S$.

39. The method as recited in claim 34, wherein the first incremental value is 3.

40. The method as recited in claim 34, wherein the first settling time is 1 $\mu S$.

41. The method as recited in claim 34, wherein the first incremental end value is 8.

42. The method as recited in claim 34, wherein the TX_PWR value is 255.

43. The method as recited in claim 34, wherein the second subtraction value is 48.

44. The method as recited in claim 34, wherein the second settling time is 50 nS.

45. The method as recited in claim 34, wherein the second incremental value is 16.

46. The method as recited in claim 34, wherein the third settling time is 50 nS.

47. The method as recited in claim 34, wherein the second incremental end value is 3.

* * * * *